(12) United States Patent
Yorozuya et al.

(10) Patent No.: US 10,744,716 B2
(45) Date of Patent: Aug. 18, 2020

(54) RESIN MATERIAL HEATING DEVICE AND RESIN MATERIAL HEATING METHOD

(71) Applicant: HONDA MOTOR CO., LTD., Minato-ku, Tokyo (JP)

(72) Inventors: Shunichi Yorozuya, Tochigi-ken (JP); Haruka Ito, Tochigi-ken (JP); Daisuke Yamamoto, Tochigi-ken (JP); Yui Miyazaki, Tochigi-ken (JP); Fumitomo Takano, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 15/904,576

(22) Filed: Feb. 26, 2018

(65) Prior Publication Data

US 2018/0250882 A1    Sep. 6, 2018

(30) Foreign Application Priority Data

Mar. 1, 2017    (JP) .................................. 2017-037878

(51) Int. Cl.
*B29C 64/295*       (2017.01)
*B29C 64/118*       (2017.01)
*B33Y 30/00*        (2015.01)
*B29C 64/209*       (2017.01)
*B33Y 10/00*        (2015.01)

(52) U.S. Cl.
CPC .......... *B29C 64/295* (2017.08); *B29C 64/118* (2017.08); *B29C 64/209* (2017.08); *B33Y 10/00* (2014.12); *B33Y 30/00* (2014.12)

(58) Field of Classification Search
CPC ... B29C 64/118; B29C 64/209; B29C 64/295; B33Y 10/00; B33Y 30/00
See application file for complete search history.

(56) References Cited

U.S. PATENT DOCUMENTS

| 2,708,843 | A | * | 5/1955 | Gibson | .............. D01D 10/0481 |
| | | | | | 68/5 E |
| 3,230,637 | A | * | 1/1966 | Taylor, Jr. | ............. D02J 13/001 |
| | | | | | 34/640 |
| 3,824,778 | A | * | 7/1974 | Flanders, Jr. | .......... D02G 1/024 |
| | | | | | 57/289 |
| 4,029,939 | A | * | 6/1977 | Parker | ................... D02J 13/003 |
| | | | | | 219/388 |
| 2010/0283172 | A1 | | 11/2010 | Swanson | |

FOREIGN PATENT DOCUMENTS

JP          50-052277        5/1975
JP          2011-511719      4/2011

OTHER PUBLICATIONS

Japanese Office Action for Japanese Patent Application No. 2017-037878 dated Jan. 22, 2019.

* cited by examiner

*Primary Examiner* — Xiao S Zhao
*Assistant Examiner* — Joseph S Leyson
(74) *Attorney, Agent, or Firm* — Amin, Turocy & Watson, LLP (57) ABSTRACT

A resin material heating device configured to heat an elongate solid resin material includes a passage conduit and a hot air supply device. An inner diameter of the passage conduit is greater than a diameter of the resin material, and allows the resin material to pass therethrough in a state of being separated from the inner wall surface of the passage conduit. The hot air supply device supplies hot air to the interior of the passage conduit.

9 Claims, 5 Drawing Sheets

RESIN MATERIAL HEATING DEVICE AND RESIN MATERIAL HEATING METHOD

CROSS-REFERENCE TO RELATED APPLICATION

This application is based upon and claims the benefit of priority from Japanese Patent Application No. 2017-037878 filed on Mar. 1, 2017, the contents of which are incorporated herein by reference.

BACKGROUND OF THE INVENTION

Field of the Invention

The present invention relates to a resin material heating device and a resin material heating method for heating an elongate solid resin material.

Description of the Related Art

As a three-dimensional printing method which enables a three-dimensional object to be obtained at a low cost with a simple configuration, a so-called fused deposition modeling method is known, in which plasticized (melted) resin filaments are laminated so as to be formed in a desired shape, and the laminated structure is solidified while maintaining the shape thereof. As disclosed, for example, in Japanese Laid-Open Patent Publication No. 2011-511719 (PCT), a three-dimensional printing apparatus in accordance with such a fused deposition modeling method comprises a resin material plasticizing device that heats a continuously supplied elongate solid filament, and discharges the filament in a plasticized state on a stage or the like as a portion to be laminated.

More specifically, the resin material plasticizing device has a liquefier tube made of a heat conductive material such as a metal or the like, and a heater for heating the liquefier tube. When the liquefier tube is heated by the heater, and an elongate solid filament is continuously supplied from one end side to the liquefier tube, the filament moves toward the other end side of the liquefier tube while carrying out heat exchange with the liquefier tube. Consequently, the plasticized filament is discharged onto the portion to be laminated via the other end side of the liquefier tube.

SUMMARY OF THE INVENTION

Incidentally, in order to enhance the plasticizing efficiency of the solid filament in the above-described three-dimensional printing apparatus, for example, it may be considered to preliminarily heat the filament before supplying it to the resin material plasticizing device. In this case, a resin material heating device may be provided at a stage prior to the resin material plasticizing device, which heats an elongate solid resin material (filament) during conveyance thereof while passing through the heating device.

As such a resin material heating device, when a configuration is applied in which the filament passes through the interior of a liquefier tube that is heated by the heater, as in the above described resin material plasticizing device, the circumferential surface of the filament melts and may become adhered to the inner wall surface of the liquefier tube, and thus, there is a concern that smooth conveyance of the filament will be hindered.

In order to avoid such a situation, instead of the aforementioned heater and liquefier tube, it may be considered, for example, to heat the filament using an infrared heater, and to allow the filament to pass within an infrared irradiating range of the infrared heater. However, in this case, since the temperature elevation characteristic differs depending on the relative positioning between the infrared heater and the filament, there is a concern that it may be difficult to obtain a filament which is uniformly elevated in temperature.

A principal object of the present invention is to provide a resin material heating device which is capable of substantially uniformly heating the entirety of an elongate solid resin material while the resin material is allowed to smoothly pass therethrough.

Another object of the present invention is to provide a resin material heating method which is capable of substantially uniformly heating the entirety of an elongate solid resin material while the resin material is allowed to smoothly pass.

According to one embodiment of the present invention, a resin material heating device is provided which is configured to heat an elongate solid resin material, the resin material heating device comprising a passage conduit having an inner diameter greater than a diameter of the resin material, and configured to allow the resin material to pass therethrough in a state of being separated from an inner wall surface of the passage conduit, and a hot air supply device configured to supply hot air to interior of the passage conduit.

With the resin material heating device according to the present invention, the resin material is heated by the hot air which is supplied to the interior of the passage conduit, without the resin material coming into contact with the inner wall surface of the passage conduit. In accordance with this feature, even if the resin material is heated while passing through the passage conduit, it is possible for the resin material to be smoothly conveyed without the resin material becoming adhered to the inner wall surface of the passage conduit. Further, since the entire circumferential surface of the resin material is exposed to the hot air in the interior of the passage conduit, unlike the case in which the resin material is heated by an infrared heater, for example, the temperature of the resin material as a whole can be raised in a substantially uniform manner.

As described above, according to the resin material heating device, while the elongate solid resin material is allowed to pass smoothly therethrough, the entirety of the resin material can be heated in a substantially uniform manner.

In the above-described resin material heating device, there are preferably further provided seal members configured to maintain the interior of the passage conduit in an airtight condition, and the hot air supply device preferably includes a circulation conduit connecting one end side of the passage conduit to which the hot air is supplied, and another end side from which the hot air is discharged, and configured to circulate the hot air, a heat source configured to heat the hot air in interior of the circulation conduit, and a blower fan configured to blow the hot air heated by the heat source toward one end side of the passage conduit, together with blowing the hot air discharged from the other end side of the passage conduit toward the heat source.

In this manner, by circulating the hot air to the passage conduit via the circulation conduit in which the heat source is disposed, the hot air can be heated efficiently, and easily maintained at a temperature suitable for heating the resin material. Further, by utilizing the hot air, the heating efficiency of the resin material can be improved.

In the resin material heating device, the resin material preferably is supplied from the other end side of the passage conduit from which the hot air is discharged, and the resin material preferably is discharged from the one end side of the passage conduit to which the hot air is supplied. As described above, after being heated by the heating source in the circulation conduit, the hot air is supplied from the one end side to the passage conduit, and after carrying out heat exchange with the resin material, the hot air is discharged from the other end side of the passage conduit. Therefore, the temperature of the hot air on the one end side of the passage conduit easily becomes higher in temperature than the temperature of the hot air on the other end side of the passage conduit. Consequently, by discharging the resin material from the one end side of the passage conduit to which the high temperature hot air is supplied, it is possible to supply the resin material to a subsequent stage of the resin material heating device in a state of being heated effectively.

In the above-described resin material heating device, the passage conduit preferably is made up from a plurality of passage conduits, and the resin material heating device preferably further includes a distribution conduit communicating with one end side of each of the plurality of passage conduits, and a merging conduit communicating with another end side of each of the plurality of passage conduits. The circulation conduit preferably circulates the hot air to each of the plurality of passage conduits via the distribution conduit and the merging conduit, the resin material preferably is supplied to each of the plurality of passage conduits via a plurality of resin material supply ports provided in the merging conduit, and is discharged from the other end side of each of the plurality of passage conduits via a plurality of resin material discharge ports provided in the distribution conduit, and the seal members preferably are disposed respectively in the resin material supply ports and the resin material discharge ports.

In this case, since a plurality of strands of the resin material can be heated at once and discharged, it is possible to more efficiently heat the resin material.

Further, according to another embodiment of the present invention, a resin material heating method is provided for heating an elongate solid resin material, the resin material heating method comprising a hot air supplying step of supplying hot air to a passage conduit having an inner diameter which is greater than a diameter of the resin material, and a heating step of allowing the resin material to pass through the passage conduit in a state with the resin material being separated from an inner wall surface of the passage conduit, thereby causing heat exchange to take place between the hot air and the resin material.

In accordance with the resin material heating method according to the present invention, it is possible to expose the entirety of the resin material to the hot air in the interior of the passage conduit, without the resin material coming into contact with the inner wall surface of the passage conduit through which the resin material passes. Consequently, it is possible to substantially uniformly heat the entirety of the resin material without any hindrance to the conveyance of the elongate solid resin material.

In the above-described resin material heating method, in the hot air supplying step, the hot air preferably is supplied from one end side of the passage conduit, and the hot air that is discharged from another end side of the passage conduit preferably is heated and supplied again to the one end side of the passage conduit. In this case, since it is possible for the hot air to be heated while being circulated through the passage conduit, the hot air can easily be maintained at a temperature suitable for heating the resin material, and hence, it is possible to improve the heating efficiency of the resin material.

In the above-described resin material heating method, in the heating step, the resin material preferably is supplied from the other end side of the passage conduit from which the hot air is discharged, and the resin material preferably is discharged from the one end side of the passage conduit to which the hot air is supplied. Compared to the hot air discharged from the other end side of the passage conduit, the hot air supplied to the one end side of the passage conduit is higher in temperature, and therefore, by discharging the resin material from the one end side of the passage conduit, it is possible to obtain a resin material which has been heated effectively.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a resin material heating device and a resin material heating method according to the present invention will be described in detail below with reference to the accompanying drawings.

The resin material heating device according to the present invention is a device for heating an elongate solid resin material, and the supply destination and usage of the resin material, which has been heated by the resin material heating device, are not particularly limited.

Figure 1:
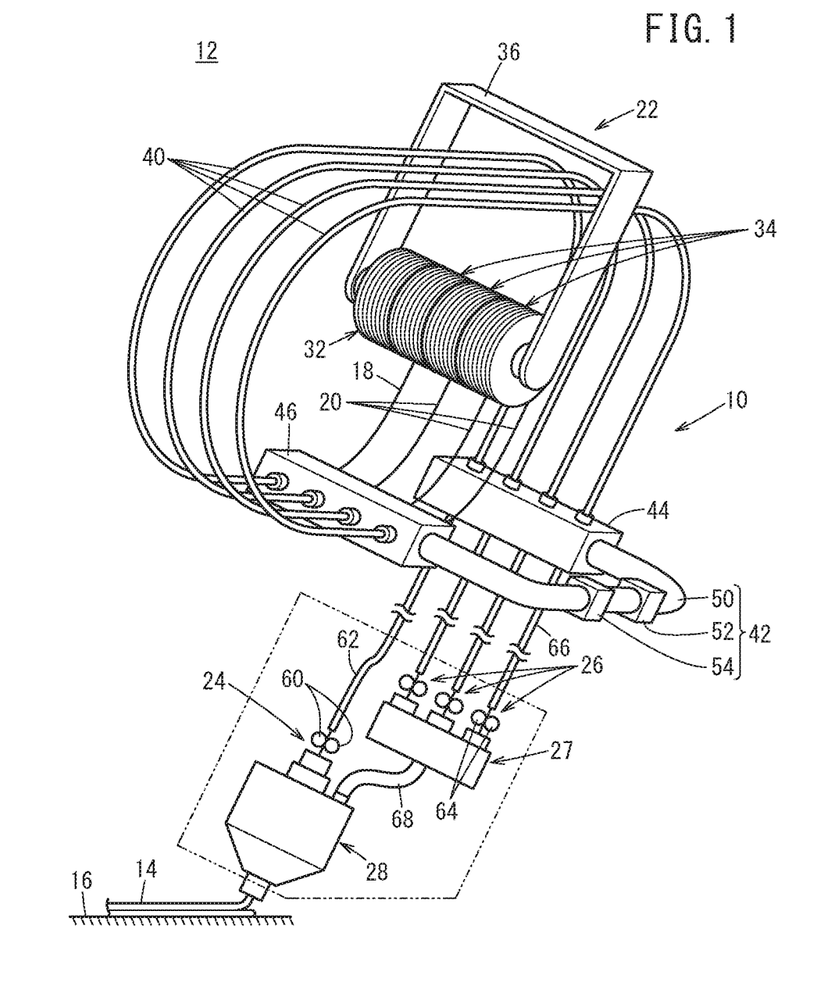
FIG. 1 is a schematic view of main components of a three-dimensional printing apparatus equipped with a resin material heating device according to an embodiment of the present invention.

As shown in FIG. 1, according to the present embodiment, a case in which a resin material heating device 10 constitutes part of a three-dimensional printing apparatus 12 will be presented and described as an example. In such a three-dimensional printing apparatus 12, filaments 14 are laminated on a stage 16 to thereby manufacture a three-dimensional object (not shown).

Figure 5A:
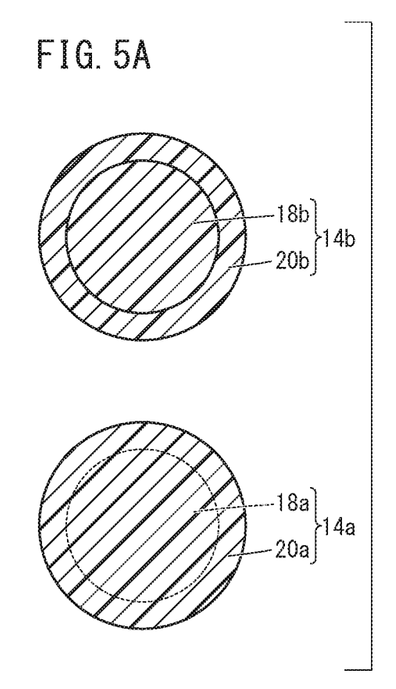
FIGS. 5A to 5C are explanatory diagrams illustrating a process of laminating and integrating filaments discharged from the nozzle of FIG. 3.
Figure 5B:
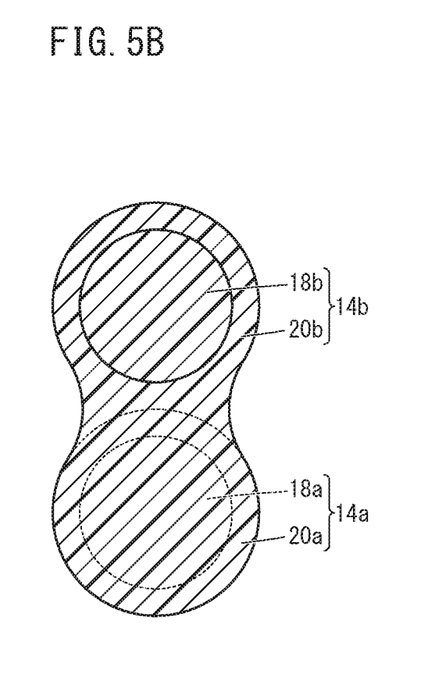
Figure 5C:
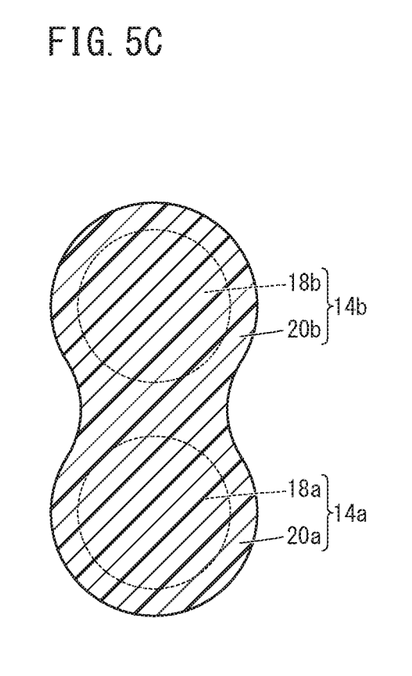

The filaments 14 are made of a thermoplastic resin such as acrylonitrile-butadiene-styrene (ABS) or polylactic acid (PLA), and as shown in FIGS. 5A to 5C, include a core material 18 (18a, 18b), and a coating material 20 (20a, 20b) that is adhered to the outer circumferential surface of the core material 18. Moreover, the core material 18 and the coating material 20 may be constituted from different types of resins, or may be constituted from the same type of resin.

Figure 4:
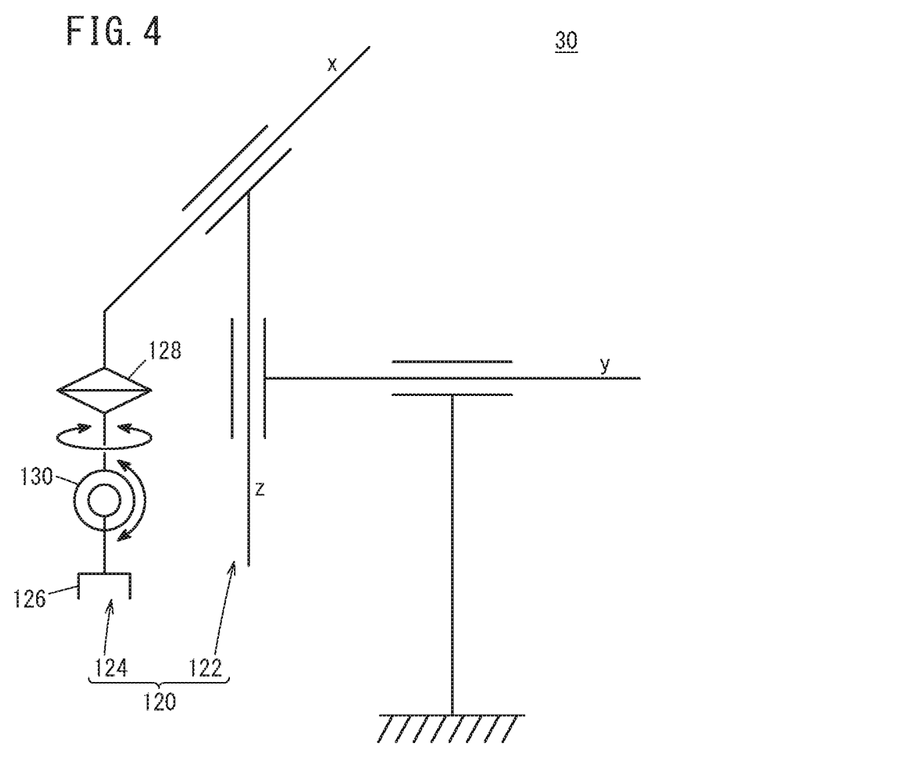
FIG. 4 is a symbolic diagram of a robot that constitutes a moving device of the three-dimensional printing apparatus.

In addition to the resin material heating device 10, the three-dimensional printing apparatus 12 is principally equipped with a resin material supply unit 22, a core material conveying device 24, coating material conveying devices 26, a coating material plasticizing device 27, a nozzle 28, and a moving device 30 (see FIG. 4).

The resin material supply unit 22 is composed of a single core material reel 32 around which the elongate solid core material 18 is wound, three coating material reels 34 around which strands of the elongate solid coating material 20 are wound respectively, and a retaining member 36 that retains the core material reel 32 and the coating material reels 34 in a rotatable manner. The number of the coating material reels 34 is not particularly limited, and can be set appropriately depending on the amount of the coating material 20 necessary for forming the filaments 14. Further, in the present embodiment, the core material 18 and the coating material 20, which are wound around the core material reel 32 and the coating material reels 34, have the same diameter, however, the present invention is not particularly limited to this feature.

The core material 18 and the coating material 20, which are withdrawn respectively from the core material reel 32 and the coating material reels 34, are transported by the core material conveying device 24 and the coating material conveying devices 26, as will be described later.

Figure 2:
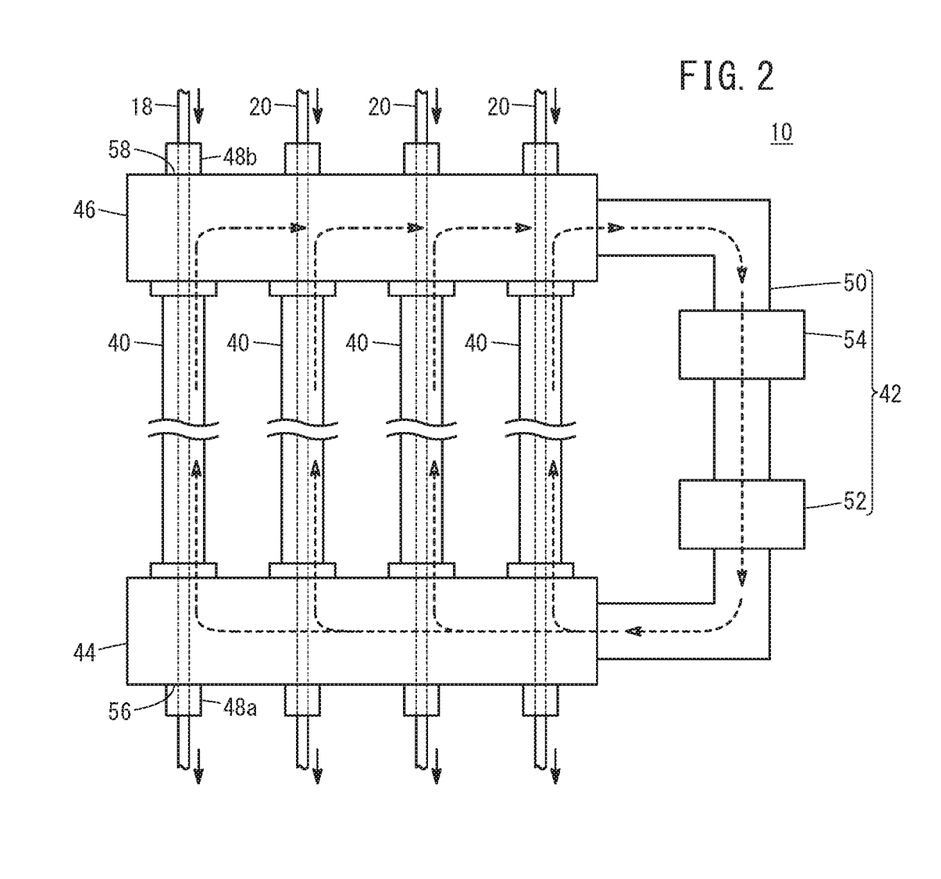
FIG. 2 is a cross-sectional view of the resin material heating device shown in FIG. 1.

In the resin material heating device 10 according to the present embodiment, while the core material 18 and the coating material 20 (hereinafter collectively referred to as resin materials), which are transported in the manner described above, are passed therethrough, as will be discussed later, the resin materials are heated to a temperature which is lower than the temperature at which the coating material 20 is heated and plasticized by the coating material plasticizing device 27. More specifically, as shown in FIGS. 1 and 2, the resin material heating device 10 includes a plurality of passage conduits 40, a hot air supply device 42, a distribution conduit 44, a merging conduit 46, and seal members 48*a*, 48*b*. The passage conduits 40 are pipes having an inner diameter which is greater than the diameter of the resin material, and which allow the resin material to pass therethrough in a state of being separated from the inner wall surface of the passage conduits 40. The number of the passage conduits 40 can be set appropriately corresponding to the number of strands of the supplied resin material. According to the present embodiment, the passage conduits 40 are made up from a total of four conduits through which one strand of the core material 18 and three strands of the coating material 20 are allowed to pass.

Sides on one end of each of the passage conduits 40 communicate with the distribution conduit 44, and sides on another end thereof communicate with the merging conduit 46. As shown in FIG. 1, the passage conduits 40 between the side of the distribution conduit 44 and the side of the merging conduit 46 are curved in substantially arcuate shapes, and the core material reel 32 and the coating material reels 34 are preferably disposed inside of such an arcuate shape. In this case, without the three-dimensional printing apparatus 12 being made large in size, it is possible for the passage conduits 40 to be given lengths that enable the resin material to be sufficiently heated to a desired temperature in the interior of the passage conduits 40.

The hot air supply device 42 includes a circulation conduit 50, a heat source 52, and a blower fan 54. The circulation conduit 50 connects the distribution conduit 44 and the merging conduit 46 in a manner so that hot air can be circulated to each of the passage conduits 40. The heat source 52 heats the hot air in the interior of the circulation conduit 50. The blower fan 54 blows the hot air, which is heated by the heat source 52, toward the distribution conduit 44, together with blowing the hot air, which is discharged into the merging conduit 46 from the passage conduits 40, toward the heat source 52.

The distribution conduit 44 is interposed between the circulation conduit 50 and one end side of the four passage conduits 40. The hot air, which is delivered to the distribution conduit 44 via the circulation conduit 50, is supplied into each of the respective passage conduits 40 while being distributed inside the distribution conduit 44. Further, as shown in FIG. 2, four resin material discharge ports 56 are formed in the distribution conduit 44, at locations thereof facing toward openings on one end side of the four passage conduits 40, respectively. Via the resin material discharge ports 56, the resin material, which has passed through the passage conduits 40, is discharged from the resin material heating device 10.

The merging conduit 46 is interposed between the other end side of the passage conduits 40 and the circulation conduit 50. The hot air, which is discharged from each of the plurality of passage conduits 40, merges inside the merging conduit 46, and is delivered to the circulation conduit 50. Further, as shown in FIG. 2, four resin material supply ports 58 are formed in the merging conduit 46, at locations thereof facing toward openings on the other end side of the four passage conduits 40, respectively. Via the resin material supply ports 58, the resin material is supplied into the passage conduits 40 from the resin material supply unit 22.

As shown in FIG. 2, the seal members 48*a*, 48*b* are disposed respectively at each of the resin material discharge ports 56 and the resin material supply ports 58. Owing thereto, while airtightness is maintained in the interior of the merging conduit 46, the passage conduits 40, the distribution conduit 44, and the circulation conduit 50 which communicate mutually with each other, it is possible for the resin material to be supplied to the passage conduits 40 from the resin material supply ports 58, and for the resin material to be discharged from the resin material discharge ports 56.

With the resin material heating device 10 which is configured in the manner described above, it is possible for the hot air to be circulated between the circulation conduit 50 and the passage conduits 40, while maintaining the hot air at a predetermined temperature by heating the hot air by the heat source 52. The predetermined temperature of the hot air is a temperature which is less than or equal to the glass transition temperature of the resin material, and furthermore, according to the present embodiment, the predetermined temperature is a temperature at which the resin material can be heated to a temperature lower than the temperature at which the coating material 20 is heated and plasticized by the coating material plasticizing device 27.

Stated otherwise, in the resin material heating device 10, the hot air moves from the one end side to the other end side inside the passage conduits 40, whereas the resin material moves from the other end side toward the one end side inside the passage conduits 40. Consequently, the resin material, which has undergone heat exchange with the hot air, is heated to a temperature which is lower than the temperature at which the coating material 20 is heated and plasticized by the coating material plasticizing device 27, and the resin material is discharged from the resin material heating device 10.

The core material conveying device 24 includes, for example, a pair of drive rollers 60, which are disposed in the vicinity of the nozzle 28, between the resin material discharge ports 56 that discharge the core material 18 from the resin material heating device 10 and the nozzle 28, and a motor (not shown) for rotating the drive rollers 60. In a state with the core material 18 being sandwiched between the pair of drive rollers 60, the drive rollers 60 are rotated, whereby the core material 18 can be conveyed, so that the core material 18 passes through the resin material heating device 10 and is supplied to the nozzle 28. Further, the drive rollers 60 are capable of being rotated in forward and reverse directions, and corresponding to the direction of rotation thereof, the core material 18 can be conveyed while being switched between a direction of being advanced toward the nozzle 28, and in a backward direction away from the nozzle 28.

A pipe 62 which is formed from a heat insulating material is disposed between the resin material heating device 10 and the core material conveying device 24. The core material 18 which is discharged from the resin material heating device 10 passes through the interior of the externally and thermally insulated pipe 62, and is conveyed to the nozzle 28 while the temperature thereof is maintained.

The coating material conveying devices 26 include, for example, respective pairs of drive rollers 64 disposed between the resin material discharge ports 56 that discharge the coating material 20 from the resin material heating device 10 and the coating material plasticizing device 27 in the vicinity of the coating material plasticizing device 27, and motors (not shown) for rotating the drive rollers 64. A number of coating material conveying devices 26 (three in the present embodiment) corresponds to the number of strands of the coating material 20 that are supplied to the resin material heating device 10. The coating materials 20 are conveyed respectively so as to pass through the resin material heating device 10, and be supplied to the coating material plasticizing device 27. The drive rollers 64 are capable of being rotated in forward and reverse directions in the same manner as the drive rollers 60, and corresponding to the direction of rotation thereof, the coating materials 20 can be conveyed while being switched between a direction of being advanced toward the coating material plasticizing device 27, and in a backward direction away from the coating material plasticizing device 27.

Pipes 66, which are formed from a heat insulating material in the same manner as the pipe 62, are disposed between the resin material heating device 10 and the coating material conveying devices 26, in a number corresponding to the number of strands (three in the present embodiment) of the coating material 20 supplied to the resin material heating device 10. The coating materials 20 which are discharged from the resin material heating device 10 pass through the interior of the externally and thermally insulated pipes 66, and are conveyed to the coating material plasticizing device 27 while the temperature thereof is maintained.

The coating material plasticizing device 27 is made up from a heater or the like for heating and plasticizing the coating material 20, and as noted above, the three strands of the coating material 20, which are heated by the resin material heating device 10, are made into a fluidic resin, and are discharged to a communicating pipe 68 that communicates with the coating material plasticizing device 27 and the nozzle 28. At this time, as described above, the coating material 20, which has been preheated by the resin material heating device 10 provided in the preceding stage, is supplied to the coating material plasticizing device 27. Therefore, without increasing the size of the coating material plasticizing device 27, it is possible to thermally conduct heat rapidly to the interior of the coating material 20, as well as to enhance the plasticizing efficiency of the coating material 20. Stated otherwise, it is possible to reduce the size and scale of the coating material plasticizing device 27.

Figure 3:
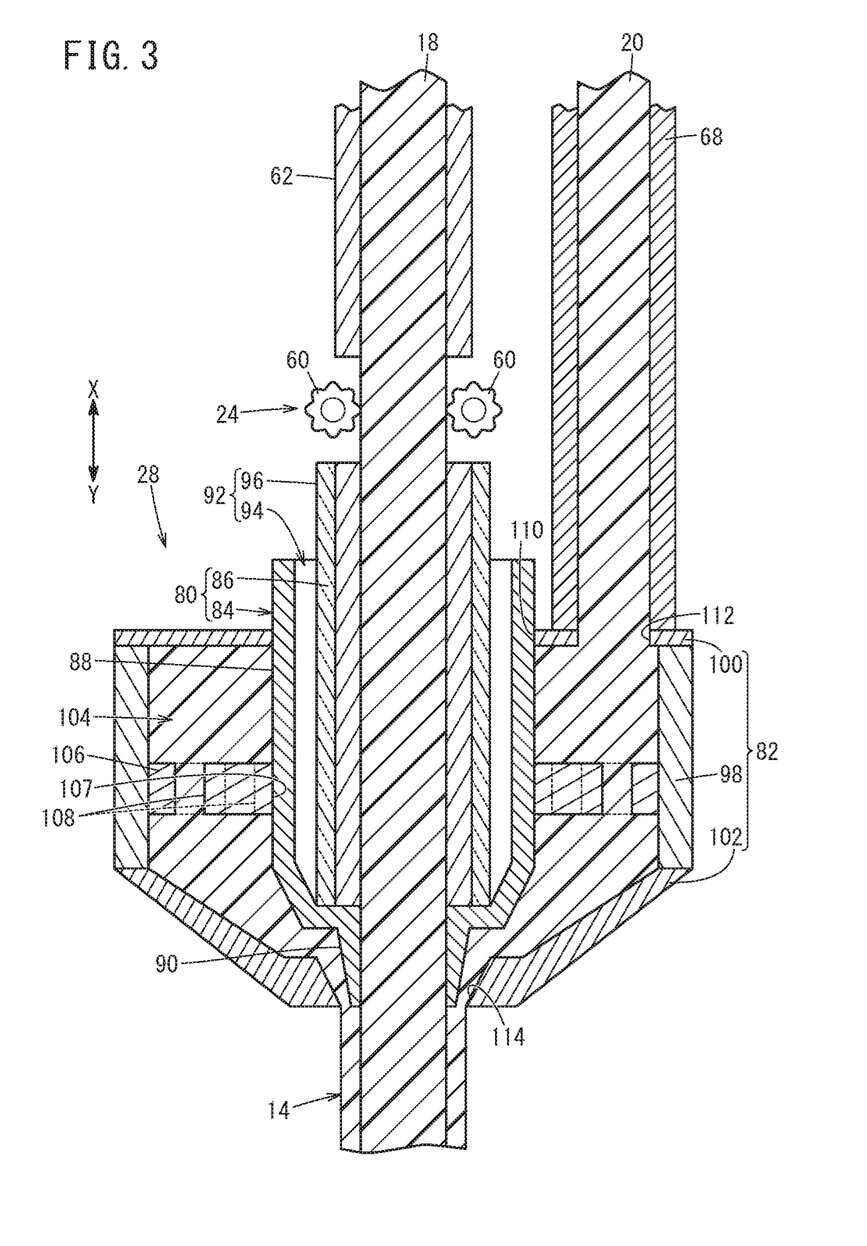
FIG. 3 is a cross-sectional view of a nozzle of the three-dimensional printing apparatus shown in FIG. 1.

As shown in FIGS. 1 and 3, the nozzle 28 discharges the filament 14 toward the stage 16. More specifically, the nozzle 28 includes a core material discharge member 80 through which the core material 18 heated by the resin material heating device 10 is discharged, and a coating material discharge member 82 through which the coating material 20, which has been plasticized by the coating material plasticizing device 27, is discharged.

The core material discharge member 80 has a main pipe 84 and a heat insulating pipe 86. The main pipe 84 includes a large diameter portion 88 provided on a proximal end side (the side in the direction of the arrow X in FIG. 3) to which the core material 18 is supplied, and a small diameter portion 90, which is provided on a distal end side (the side in the direction of the arrow Y in FIG. 3) that discharges the core material 18, and is smaller in diameter than the large diameter portion 88. The distal end side of the large diameter portion 88 is tapered in diameter toward the small diameter portion 90. Further, a step is formed between the distal end of the large diameter portion 88 and the proximal end of the small diameter portion 90, on the basis of a mutual diametrical difference therebetween.

The heat insulating pipe 86 is formed from a heat insulating material, and the inner diameter thereof is substantially equivalent to the inner diameter of the small diameter portion 90 of the main pipe 84, whereas the outer diameter thereof is smaller than the inner diameter of the large diameter portion 88. As described above, the heat insulating pipe 86 is disposed inside the large diameter portion 88, so that an end surface on the distal end side thereof abuts against the stepped surface formed between the large diameter portion 88 and the small diameter portion 90.

A heat shielding portion 92 is provided between the main pipe 84 and the heat insulating pipe 86. The heat shielding portion 92 is constituted from a space 94 formed between the large diameter portion 88 and the heat insulating pipe 86, and a heat insulating material 96 or the like provided in the space 94, and which functions to provide heat shielding between the interior and the exterior of the core material discharge member 80. Further, the heat shielding portion 92 may further include, for example, a coolant circulating mechanism (not shown), which enables a coolant such as air or the like to flow through the space 94. In this case, it is possible to more suitably provide heat shielding between the interior and the exterior of the core material discharge member 80.

The coating material discharge member 82 includes a reservoir tube 98, a lid member 100 that closes an opening on a proximal end side of the reservoir tube 98, and a tapered portion 102 disposed on the distal end side of the reservoir tube 98.

The reservoir tube 98 is formed of a heat insulating material. An inner diameter of the reservoir tube 98 is larger than the outer diameter of the large diameter portion 88 of the main pipe 84, and is arranged so as to cover an outer circumferential surface excluding a portion on the proximal end side of the large diameter portion 88. More specifically, between the inner circumferential surface of the reservoir tube 98 and the outer circumferential surface of the large diameter portion 88, a reservoir portion 104 is formed in which the plasticized coating material 20 is capable of being stored.

As shown in FIG. 3, a disk member 106 may be disposed in the reservoir portion 104. The disk member 106 is formed with an insertion hole 107 through which the main pipe 84 is inserted substantially in the center in a diametrical direction, together with a plurality of through holes 108 that penetrate along the thickness direction more on an outer circumferential side than the insertion hole 107. The plasticized coating material 20 flows via the through holes 108 from the proximal end side toward the distal end side of the reservoir portion 104, whereby the pressure and temperature of the coating material 20 can be equalized.

The lid member 100 is formed with an insertion hole 110 through which a proximal end side of the main pipe 84 is inserted substantially in the center in a diametrical direction, together with a supply port 112 to which the communicating pipe 68 is connected more on an outer circumferential side than the insertion hole 110. The plasticized coating material 20 is supplied to the reservoir portion 104 via the supply port 112.

The tapered portion 102 extends from the reservoir tube 98 while becoming reduced in diameter toward the distal end side. A discharge port 114, which is capable of discharging the coating material 20 inside the reservoir portion 104, is formed at the distal end of the tapered portion 102. The inner diameter of the discharge port 114 is greater than the outer diameter of the distal end side of the small diameter portion 90, and the distal end side of the small diameter portion 90 is disposed inside the discharge port 114.

More specifically, the nozzle 28, which is configured in the manner described above, discharges the core material 18 having a lower temperature than the plasticized coating material 20 from the distal end side of the small diameter portion 90, and together therewith, discharges the plasticized coating material 20 from the discharge port 114 of the tapered portion 102. Owing thereto, the filament 14 having the coating material 20 adhered to the outer circumferential surface of the core material 18 is formed, and is capable of being discharged.

Further, as described above, in the nozzle 28, the core material discharge member 80 is disposed inside the coating material discharge member 82. Therefore, for example, compared with a case in which the core material discharge member 80 and the coating material discharge member 82 are arranged side by side, it is possible to reduce the size of the nozzle 28. Thus, it is possible to reduce the size and scale of the three-dimensional printing apparatus 12 as a whole.

In the case that the filament 14 is continuously discharged from the nozzle 28, the respective drive rollers 60, 64 of the core material conveying device 24 and the coating material conveying devices 26 may be continuously rotated in one direction. On the other hand, in the case that discharging of the filament 14 from the nozzle 28 is to be halted, rotation of the respective drive rollers 60, 64 may be stopped. In this case, concerning the drive rollers 64 of the coating material conveying devices 26, by temporarily rotating the drive rollers 64 in the other direction and then stopping them, any concern over the plasticized coating material 20 being excessively discharged from the coating material discharge member 82 can be dispensed with. In addition, the nozzle 28 may be provided with a freely openable and closeable lid (not shown), which closes both the distal end side of the small diameter portion 90 and the discharge port 114, or only the discharge port 114.

As shown schematically using the symbolic diagram of FIG. 4, the moving device 30 includes a robot 120 and a control unit (not shown). The robot 120 includes a main body portion 122 operated on the basis of a three-dimensional orthogonal coordinate system, and an articulated arm 124 attached to the main body portion 122. The arm 124 comprises a first joint 128 and a second joint 130 provided in this order from a proximal end toward a distal wrist 126 of the arm 124. The core material conveying device 24, the coating material conveying devices 26, the coating material plasticizing device 27, and the nozzle 28 (the constituent elements surrounded by the two-dot-dashed line in FIG. 1, referred to collectively as the nozzle 28, etc.) are fixed to the wrist 126.

By driving the robot 120 under the control of the control unit, the moving device 30 is capable of moving the nozzle 28, etc., in three dimensions with respect to the stage 16. At this time, because the nozzle 28 and the coating material plasticizing device 27 are reduced in size and scale as described above, it is possible to easily move the nozzle 28, etc., with high accuracy by the moving device 30.

The three-dimensional printing apparatus 12 equipped with the resin material heating device 10 according to the present embodiment is basically configured in the manner described above. More specifically, the resin material heating device 10, which is applied to the three-dimensional printing apparatus 12, supplies the resin material, which has been heated to the aforementioned temperature, to the coating material plasticizing device 27 and the nozzle 28 in order to form the filament 14.

Hereinafter, a resin material plasticizing method according to the present embodiment will be described in relation to operations of the three-dimensional printing apparatus 12 including operations of the resin material heating device 10.

With the three-dimensional printing apparatus 12, by driving the core material conveying device 24 and the coating material conveying devices 26, the elongate solid core material 18 and the coating material 20, which are drawn out from the core material reel 32 and the coating material reels 34, are continuously supplied to the resin material heating device 10.

At this time, in the resin material heating device 10, by driving the heat source 52 and the blower fan 54, the hot air is circulated between the circulation conduit 50 and each of the respective passage conduits 40. More specifically, the hot air immediately after having been heated by the heat source 52 is supplied to the distribution conduit 44 via the circulation conduit 50, whereby the hot air is supplied at a high temperature from the one end side thereof to each of the four passage conduits 40.

At this time, the temperature of the hot air is a temperature which is less than or equal to the glass transition temperature of the resin material, and is a temperature at which the resin material, by undergoing heat exchange with the hot air, can be heated to a temperature lower than the temperature at which the coating material 20 is heated and plasticized by the coating material plasticizing device 27. In addition, the low temperature hot air, which passes through the passage conduits 40, and is discharged from the other end side thereof into the merging conduit 46, is supplied again to the heat source 52 via the circulation conduit 50. Stated otherwise, the hot air supplying step of the resin material heating method according to the present embodiment is performed.

In this manner, the resin materials are supplied from the other end side of the passage conduits 40 that discharge the hot air, via the resin material supply ports 58 of the merging conduit 46, and into the interior of the passage conduits 40. Consequently, the resin materials are allowed to pass through the passage conduits 40 in a state in which the inner wall surfaces of the passage conduits 40 and the resin materials are separated from each other, and heat exchange between the hot air and the resin material is carried out. Stated otherwise, the heating step of the resin material heating method according to the present embodiment is performed. In addition, the resin materials, which have been raised in temperature as described above, are discharged from the resin material heating device 10 via the resin material discharge ports 56 of the distribution conduit 44. Among these resin materials, the core material 18 is supplied to the pipe 62, and the coating material 20 is supplied to the pipes 66.

As described above, with the resin material heating device 10 and the resin material heating method according to the present embodiment, even if the resin material is heated while passing through the passage conduits 40, it is possible for the resin material to be smoothly conveyed without the resin material becoming adhered to the inner wall surfaces of the passage conduits 40. Further, since the entire circumferential surface of the resin material is exposed to the hot air in the interior of the passage conduits 40, unlike the case in which the resin material is heated by an infrared heater, for example, the temperature of the resin material as a whole can be raised in a substantially uniform manner. Accordingly, while the elongate solid resin material is allowed to pass smoothly therethrough, the entirety of the resin material can be heated in a substantially uniform manner.

Further, by circulating the hot air to the passage conduits 40 via the circulation conduit 50 in which the heat source 52 is disposed, the hot air can be heated efficiently, and easily maintained at a temperature suitable for heating the resin material. By utilizing the hot air, the heating efficiency of the resin material can be improved.

Furthermore, after being heated by the heat source 52 in the circulation conduit 50, the hot air is supplied from the one end side of the passage conduits 40, and after carrying out heat exchange with the resin material, the hot air is discharged from the other end side of the passage conduits 40. Therefore, the temperature of the hot air on the one end side of the passage conduits 40 easily becomes higher in temperature than the temperature of the hot air on the other end side of the passage conduits 40. In this manner, by discharging the resin material from the one end side of the passage conduits 40 to which the high temperature hot air is supplied, it is possible to supply the resin material to a subsequent stage of the resin material heating device 10 in a state of being heated effectively.

The coating material 20, which is supplied from the resin material heating device 10 to the pipes 66, is supplied respectively therefrom to the coating material plasticizing device 27. In addition, the coating material 20, which was plasticized in the coating material plasticizing device 27 and has become a fluidic resin, is supplied to the coating material discharge member 82 of the nozzle 28 via the communicating pipe 68, and is stored in the reservoir portion 104.

On the other hand, the core material 18, which is supplied from the resin material heating device 10 to the pipe 62, is supplied to the core material discharge member 80 of the nozzle 28. In the core material discharge member 80, the core material 18 passes through the interior of the heat insulating pipe 86 of the core material discharge member 80, which is thermally insulated from the exterior by the heat shielding portion 92, etc. Therefore, as described above, in the reservoir portion 104, which is formed between the outer circumferential surface of the main pipe 84 of the core material discharge member 80 and the inner circumferential surface of the reservoir tube 98 of the coating material discharge member 82, it is possible to suppress the heat of the coating material 20 from being transferred to the core material 18, even if the melted high temperature coating material 20 is stored therein.

Therefore, the core material discharge member 80 discharges the core material 18, which is lower in temperature than the plasticized coating material 20, from the small diameter portion 90. On the other hand, in the coating material discharge member 82, the plasticized coating material 20 is discharged from the discharge port 114 of the tapered portion 102, and the coating material 20 is adhered to the outer circumferential surface of the core material 18 that is discharged from the small diameter portion 90. Consequently, at the nozzle 28, the filament 14 is formed and discharged, which is made up from the plasticized coating material 20 and the core material 18 that is plastically deformable but to a lower temperature than the plasticized coating material 20.

Moreover, the core material 18, which is of a temperature lower than the plasticized coating material 20, may be made to reach a temperature at which plastic deformation thereof is possible at a stage prior to the coating material 20 being adhered thereto, or stated otherwise, by being heated in the resin material heating device 10. Alternatively, the core material 18 may be made to reach a temperature at which plastic deformation thereof is possible by depositing the plasticized coating material 20 thereon and conducting heat therefrom. More specifically, before and immediately after the coating material 20 is adhered to the core material 18, the temperature of the core material 18 may or may not have reached the temperature at which plastic deformation thereof is possible. When the filament 14 is laminated onto a portion to be laminated, it is sufficient insofar as the core material 18 that constitutes the filament 14 is of a temperature at which plastic deformation thereof is possible even while being at a lower temperature than that of the plasticized coating material 20.

In the foregoing manner, by the filament 14 being discharged from the nozzle 28, together with the nozzle 28, etc., being moved in three dimensions by the moving device 30, the filament 14 can be laminated while being pressed against the portion to be laminated on the stage 16.

As to the portion to be laminated, in the case that the filament 14, which is discharged from the nozzle 28, is the first layer that is to be stacked on the stage 16, the portion to be laminated is placed at a predetermined position of the stage 16. Further, in the case that the filament 14, which is discharged from the nozzle 28, is a second or subsequent layer to be stacked on the previously laminated filament 14, the portion to be laminated is placed at a predetermined position of the previously laminated filament 14.

FIGS. 5A to 5C are explanatory diagrams for explaining the process of laminating and integrating the filaments 14, and more specifically, are cross-sectional views showing a previously laminated filament 14a, and a filament 14b for which a portion to be laminated is on the filament 14a.

As shown in FIG. 5A, the filament 14b immediately after being discharged from the nozzle 28 is in a state in which the plasticized coating material 20b is adhered to the outer circumferential surface of the core material 18b, which is at a lower temperature than that of the coating material 20b. As shown in FIG. 5B, when the filament 14b is pressed and laminated with respect to the previously laminated filament 14a, the coating material 20b flows so as to fill the space between the filament 14b and the filament 14a. In this state, by the coating material 20b becoming solidified, as shown in FIG. 5C, the filament 14a and the filament 14b can be integrated via the coating materials 20a, 20b.

Moreover, in FIGS. 5A to 5C, an aspect is shown in which the filaments 14a, 14b, which are of a state in which the core materials 18a, 18b and the coating materials 20a, 20b are disposed so as to be concentric with each other, or in other words, a state in which the coating materials 20*a*, 20*b* are adhered with a substantially uniform thickness in the circumferential direction around the entire outer circumferential surface of the core materials 18*a*, 18*b*, are laminated on each other and integrated. However, it is a matter of course that the relative positioning of the coating materials 20*a*, 20*b* with respect to the core materials 18*a*, 18*b*, as well as the shape of the coating materials 20*a*, 20*b* may assume various forms, depending on the gravity applied to the filaments 14*a*, 14*b*, the viscosity of the plasticized coating materials 20*a*, 20*b*, and the like. The filament 14*a* and the filament 14*b* can be integrated together by at least allowing the coating material 20*b* to become solidified, in a state in which the coating material 20*b* is interposed between the core material 18*a* and the core material 18*b*.

In this manner, a three-dimensional object can be obtained by stacking all of the necessary amount of the filaments 14, including the filaments 14*a*, 14*b*, so as to form a desired shape, and then allowing the filaments 14 to solidify.

As described above, according to the three-dimensional printing apparatus 12, for example, in comparison with a case in which plasticized filaments, all of which have been heated to a uniform temperature, are laminated and solidified, the core material 18*b* is kept at a low temperature, or in other words, only the coating material 20*b* is heated to a high temperature, and therefore, by such an amount, it is possible for the filament 14*b* to become solidified more rapidly. On the other hand, since the coating material 20*b* can be sufficiently heated and plasticized, the coating material 20*b* can be integrated suitably with the adjacent filament 14*a*. Stated otherwise, it is possible to shorten the time required for the plasticized filament 14*b* to solidify, while avoiding a deterioration in the adhesiveness between the filaments 14*a*, 14*b*.

As a result, solidification of the filament 14*b* easily follows with the speed at which the nozzle 28 is moved, and the filaments 14, including the filaments 14*a*, 14*b*, can be laminated in a desired shape. In addition, during the period until the filaments 14 become solidified following lamination thereof, it is possible to suppress the occurrence of deformations such as deflection and sagging. Furthermore, as described above, the amount of the plasticized portion that is heated to a high temperature can be reduced, and by this portion, the amount by which the filament 14 undergoes contraction due to solidification thereof can be reduced.

Accordingly, with the three-dimensional printing apparatus 12, a three-dimensional object, which is superior both in terms of manufacturing efficiency and molding accuracy, can be obtained. By applying the resin material heating device 10 according to the present embodiment to the three-dimensional printing apparatus 12, it is possible to further improve manufacturing efficiency and molding accuracy of three-dimensional objects obtained by the three-dimensional printing apparatus 12.

More specifically, by applying the resin material heating device 10 to the three-dimensional printing apparatus 12, and heating the entirety of the core material substantially evenly while the core material 18 is smoothly passed therethrough, the filament 14 can be obtained efficiently having the core material 18 at a temperature which is lower than that of the plasticized coating material 20 yet at which the core material 18 is capable of being plastically deformed. In this manner, by increasing the temperature of the core material 18, it is possible for the filament 14 to be laminated while easily undergoing deformation. In addition, even if the filament 14 is deformed, it is possible to avoid distortion or strain from remaining in the interior of the filament 14.

Further, since the entirety of the coating material 20 can also be preheated substantially evenly while being allowed to smoothly pass through the resin material heating device 10, the coating material 20 can be plasticized efficiently in the coating material plasticizing device 27. Consequently, because the coating material plasticizing device 27 can be reduced in size and scale as described above, it is possible to easily move the nozzle 28, etc., with high accuracy by the moving device 30, and to improve the accuracy with which the filaments 14 are laminated. Owing thereto, it is possible to improve the manufacturing efficiency of three-dimensional objects, while molding accuracy and quality are suitably improved.

The present invention is not particularly limited to the above-described embodiments, and various modifications are possible without departing from the essence and gist of the present invention.

For example, in the resin material heating device 10 according to the above-described embodiment, four passage conduits 40 are provided through which one strand of the core material 18 and three strands of the coating material 20 are allowed to pass. However, the present invention is not particularly limited to this feature. The resin material heating device 10 may be provided with only one passage conduit 40, or may be provided with a plurality of passage conduits other than four. Further, in the case that the resin material heating device 10 is equipped with only one passage conduit 40, the distribution conduit 44 and the merging conduit 46 are not provided, and hot air is circulated directly between the passage conduit 40 and the circulation conduit 50. In this case, the seal members 48*a*, 48*b* may be disposed, for example, at openings on both ends of the passage conduit 40, in order to keep the interior of the passage conduit 40 in an airtight condition.

Further, the resin material heating device 10 need not necessarily have a configuration in which hot air is circulated between the passage conduits 40 and the circulation conduit 50, and it also is possible for the hot air to be passed from one end side to the other end side of the passage conduits 40.

In the resin material heating device 10 according to the above-described embodiment, the resin material is supplied from the other end side of the passage conduits 40 that discharge the hot air, however, the resin material may also be supplied from the one end side of the passage conduits 40 to which the hot air is supplied.

The resin material heating device 10 according to the above-described embodiment is applied to a case of heating the core material 18 and the coating material 20 in order to form the filament 14, however, the present invention is not particularly limited to this feature. For example, the present invention may be applied to a case of preheating a general type of filament which is used in shaping a three-dimensional object in accordance with a three-dimensional printing method. Further, the temperature of the resin material to be heated by the resin material heating device 10 can be set appropriately depending on the usage thereof or the like.

Moreover, with the three-dimensional printing apparatus 12, by the coating material 20 being adhered to the entire outer circumferential surface of the core material 18 with a substantially uniform thickness in the circumferential direction, the filament 14 is formed in which the cylindrical core material 18 and the annular coating material 20 are arranged concentrically. However, the filament 14 may be formed by the coating material 20 being adhered only to a portion of the outer circumferential surface of the core material 18, or the filament 14 may be formed in a manner so that the cylindrical core material 18 and the annular coating material 20 are arranged eccentrically.

Further, although the moving device 30 is equipped with the robot 120 as shown in FIG. 4, the moving device 30 is not particularly limited, and insofar as it is capable of moving the nozzle 28, etc., in three dimensions with respect to the stage 16, a variety of configurations can be adopted therefor.

What is claimed is:

1. A resin material heating device configured to heat an elongate solid resin material, the resin material heating device comprising:
    a plurality of passage conduits each having an inner diameter greater than a diameter of the resin material, and each configured to allow the resin material to pass therethrough in a state of being separated from an inner wall surface of each of the passage conduits;
    a hot air supply device configured to supply hot air to interior of the passage conduits;
    a distribution conduit directly connected to one end side of each of the plurality of passage conduits to which the hot air is supplied; and
    a merging conduit directly connected to another end side of each of the plurality of passage conduits from which the hot air is discharged,
    wherein the hot air supply device includes a circulation conduit configured to circulate the hot air in each of the plurality of passage conduits via the distribution conduit and the merging conduit,
    the plurality of passage conduits are arranged alongside each other,
    each of the distribution conduit and the merging conduit extend in a direction along which the plurality of passage conduits are arranged, and
    the circulation conduit connects an end of the distribution conduit to an end of the merging conduit in a direction in which the distribution conduit and the merging conduit extend.

2. The resin material heating device according to claim 1, further comprising seal members configured to maintain the interior of the passage conduits in an airtight condition; and
    wherein the hot air supply device comprises:
        a heat source configured to heat the hot air in interior of the circulation conduit; and
        a blower fan configured to blow the hot air heated by the heat source toward the one end side of the passage conduits, together with blowing the hot air discharged from the other end side of the passage conduits toward the heat source.

3. The resin material heating device according to claim 2, wherein
    the resin material is supplied to each of the plurality of passage conduits via a plurality of resin material supply ports provided in the merging conduit, and is discharged from the other end side of each of the plurality of passage conduits via a plurality of resin material discharge ports provided in the distribution conduit; and
    the seal members are disposed respectively in the resin material supply ports and the resin material discharge ports.

4. The resin material heating device according to claim 3, wherein each of the plurality of passage conduits has an arcuate shape, and a direction of a surface on which the plurality of resin material supply ports in the merging conduit are located and a direction of a surface on which the plurality of resin material discharge ports in the distribution conduit are located are different from each other.

5. The resin material heating device according to claim 3, further comprising:
    a nozzle to which the resin material discharged from one of the plurality of resin material discharge ports is supplied; and
    a coating material plasticizing unit supplied with the resin material discharged from the remaining resin material discharge ports, and configured to plasticize the supplied resin material by heat.

6. A resin material heating method for heating an elongate solid resin material, the resin material heating method comprising:
    a hot air supplying step of supplying hot air to a plurality of passage conduits each having an inner diameter which is greater than a diameter of the resin material; and
    a heating step of allowing the resin material to pass through each of the plurality of passage conduits in a state with the resin material being separated from an inner wall surface of the passage conduits, thereby causing heat exchange to take place between the hot air and the resin material,
    wherein the plurality of passage conduits are arranged alongside each other, a distribution conduit is directly connected to one end side of each of the plurality of passage conduits, a merging conduit is directly connected to another end side of each of the plurality of passage conduits, each of the distribution conduit and the merging conduit extend in a direction along which the plurality of passage conduits are arranged,
    in the hot air supplying step, the hot air is supplied to the distribution conduit through a circulation conduit connected to one end of the distribution conduit in a direction in which the distribution conduit extends, the hot air discharged from the merging conduit to the circulation conduit is heated, while the circulation conduit is connected to one end of the merging conduit in a direction in which the merging conduit extends, and the heated hot air is supplied to the distribution conduit again through the circulation conduit.

7. The resin material heating method according to claim 6, wherein, in the heating step, the resin material is supplied to each of the plurality of passage conduits via a plurality of resin material supply ports provided in the merging conduit, and the resin material is discharged from the plurality of the passage conduits to a plurality of resin material discharge ports provided in the distribution conduit.

8. The resin material heating method according to claim 7, wherein, in the heating step, the resin material is allowed to pass through the plurality of passage conduits in an arcuate shape, and a direction in which the resin material is supplied to the plurality of resin material supply ports is non-parallel to a direction in which the resin material is discharged from the plurality of resin material discharge ports.

9. The resin material heating method according to claim 7, wherein the resin material discharged from one of the plurality of resin material discharge ports is supplied to a nozzle, the resin material discharged from the remaining resin material discharge ports is supplied to a coating material plasticizing unit, and the coating material plasticizing unit heats to plasticize the resin material.

* * * * *